(12) United States Patent
Tsirtsis et al.

(10) Patent No.: US 8,532,663 B2
(45) Date of Patent: Sep. 10, 2013

(54) CONFIGURING A BASE STATION TO ACT AS A REGIONAL MOBILITY AGENT

(75) Inventors: George Tsirtsis, New York, NY (US); M. Scott Corson, Gillette, NJ (US); Vince Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 774 days.

(21) Appl. No.: 11/624,181

(22) Filed: Jan. 17, 2007

(65) Prior Publication Data

US 2008/0171548 A1 Jul. 17, 2008

(51) Int. Cl.
| | |
|---|---|
| H04M 1/66 | (2006.01) |
| H04W 4/00 | (2009.01) |
| H04W 36/00 | (2009.01) |
| H04J 3/06 | (2006.01) |
| H04J 3/24 | (2006.01) |

(52) U.S. Cl.
USPC ........ 455/437; 455/410; 455/432.1; 455/438; 370/331; 370/350; 370/349

(58) Field of Classification Search
USPC ........................................................ 455/437
See application file for complete search history.

(56) References Cited

U.S. PATENT DOCUMENTS

| | | | |
|---|---|---|---|
| 2002/0141360 A1* | 10/2002 | Baba et al. ..................... | 370/331 |
| 2003/0035410 A1* | 2/2003 | Laroia et al. .................. | 370/350 |
| 2004/1098622 | 5/2004 | O'Neill | |
| 2004/0203749 A1* | 10/2004 | Iyer et al. .................... | 455/432.1 |
| 2005/0096051 A1* | 5/2005 | Lee et al. ...................... | 455/438 |
| 2005/0119001 A1* | 6/2005 | Watanabe ..................... | 455/436 |
| 2006/0056351 A1* | 3/2006 | Wall .............................. | 370/331 |
| 2008/0037478 A1* | 2/2008 | Na et al. ........................ | 370/338 |

FOREIGN PATENT DOCUMENTS

| | | |
|---|---|---|
| CN | 1596023 A | 3/2005 |
| WO | WO2008013218 A1 | 1/2008 |

OTHER PUBLICATIONS

International Search Report, PCT/US08/051369, International Search Authority, European Patent Office, Jul. 15, 2008.
Written Opinion, PCT/US08/051369, International Search Authority, European Patent Office, Jul. 15, 2008.
O'Neill, "Nested MIP for IP Mobility Management," Internet Draft, May 8, 2002, Internet Engineering Task Force, CH, XP015004695.
Taiwan Search Report—TW097101829—TIPO—Jun. 9, 2011.

\* cited by examiner

*Primary Examiner* — Lester Kincaid
*Assistant Examiner* — Andy Gu
(74) *Attorney, Agent, or Firm* — Michelle Gallardo

(57) ABSTRACT

Described herein are mechanisms and methods that facilitate utilizing a base station as a regional mobility agent (e.g., regional home agent, regional foreign agent, and/or the like). Thus, a base station can have functionality embedded therein that enables the base station to create tunnels with other base stations and selectively direct data intended for a wireless terminal to those base stations. Such base stations can then transmit the data to the wireless terminal.

21 Claims, 12 Drawing Sheets

CONFIGURING A BASE STATION TO ACT AS A REGIONAL MOBILITY AGENT

BACKGROUND

I. Field

The following description relates generally to wireless communications, and, amongst other things, to flexible communication schemes for wireless communications systems.

II. Background

Wireless networking systems have become a prevalent means to communicate with others worldwide. Wireless communication devices, such as cellular telephones, personal digital assistants, and the like have become smaller and more powerful in order to meet consumer needs and to improve portability and convenience. Consumers have become dependent upon these devices, demanding reliable service, expanded areas of coverage, additional services (e.g., web browsing capabilities), and continued reduction in size and cost of such devices.

A typical wireless communication network (e.g., employing frequency, time, and code division techniques) includes one or more base stations that provides coverage areas to subscribers as well as mobile (e.g., wireless) devices that can transmit and receive data within the coverage areas. A typical base station can simultaneously transmit multiple data streams to multiple devices for broadcast, multicast, and/or unicast services, wherein a data stream is a stream of data that can be of independent reception interest to a user device. A user device within the coverage area of that base station can be interested in receiving one, more than one or all the data streams carried by the composite stream. Likewise, a user device can transmit data to the base station or another user device.

In wireless networks that enable a wireless terminal to connect to the Internet, Mobile IP (MIP) is a common protocol that is often utilized to facilitate mobility of the wireless terminal while maintaining connection to the Internet. Using MIP, wireless terminals can alter their point of attachment to the Internet without altering Internet Protocol (IP) addresses associated therewith. Thus, mobile devices can transition amongst several different local area networks (LANs) that are associated with different IP addresses without forcing the mobile to alter a point of attachment to the Internet.

Additionally, in some systems Mobile IP can be utilized to enable a wireless terminal to be associated with multiple links at different access points. More particularly, multiple tunnels can be created through utilization of Mobile IP, and certain traffic can be directed by way of each of the tunnels (e.g., based upon expected throughput, measured signal-to-noise ratio, or other suitable factor(s)).

SUMMARY

The following presents a simplified summary in order to provide a basic under standing of some aspects of the disclosed subject matter. This summary is not an extensive overview, and is not intended to identify key/critical elements or to delineate the scope of such subject matter. Its sole purpose is to present some concepts in a simplified form as a prelude to the more detailed description that is presented later.

Briefly described, the disclosed subject matter relates generally to enabling a base station to act as a regional mobility management agent. In more detail, a wireless terminal can request a physical link with a base station, and such base station can act as a regional mobility agent with respect to the wireless terminal. Therefore, if the wireless terminal obtains another physical link with another base station, data destined for the wireless terminal (from a home agent) can be first directed to the regional mobility agent. Accordingly, a tunnel need not be created between a home agent and a base station each time a wireless terminal obtains a physical link with another base station.

In a detailed example, a tunnel can be created between a home agent and a first base station for data that is intended for a wireless terminal. Additionally, the first base station can be configured to act as a regional mobility agent. When the wireless terminal requests a link with a second base station, such base station can utilize regional registration techniques to register with the first base station (that is acting as the regional mobility agent). Additionally, a tunnel can be created between the first and second base stations, and the first base station can be aware of particular filter rules that are to be effectuated with respect to the second base station. Accordingly, when the home agent delivers data intended for the wireless terminal to the first base station, the first base station, can selectively transfer a subset of such data to the second base station for transmission to the wireless terminal.

To the accomplishment of the foregoing and related ends, certain illustrative, aspects are described herein in connection with the following description and the annexed drawings. These aspects are indicative, however, of but a few of the various ways in which the principles of the disclosed subject matter may be employed and the claimed matter is intended to include all such aspects and their equivalents. Other advantages and novel features may become apparent from the following detailed description when considered in conjunction with the drawings.

DETAILED DESCRIPTION

Figure 1:
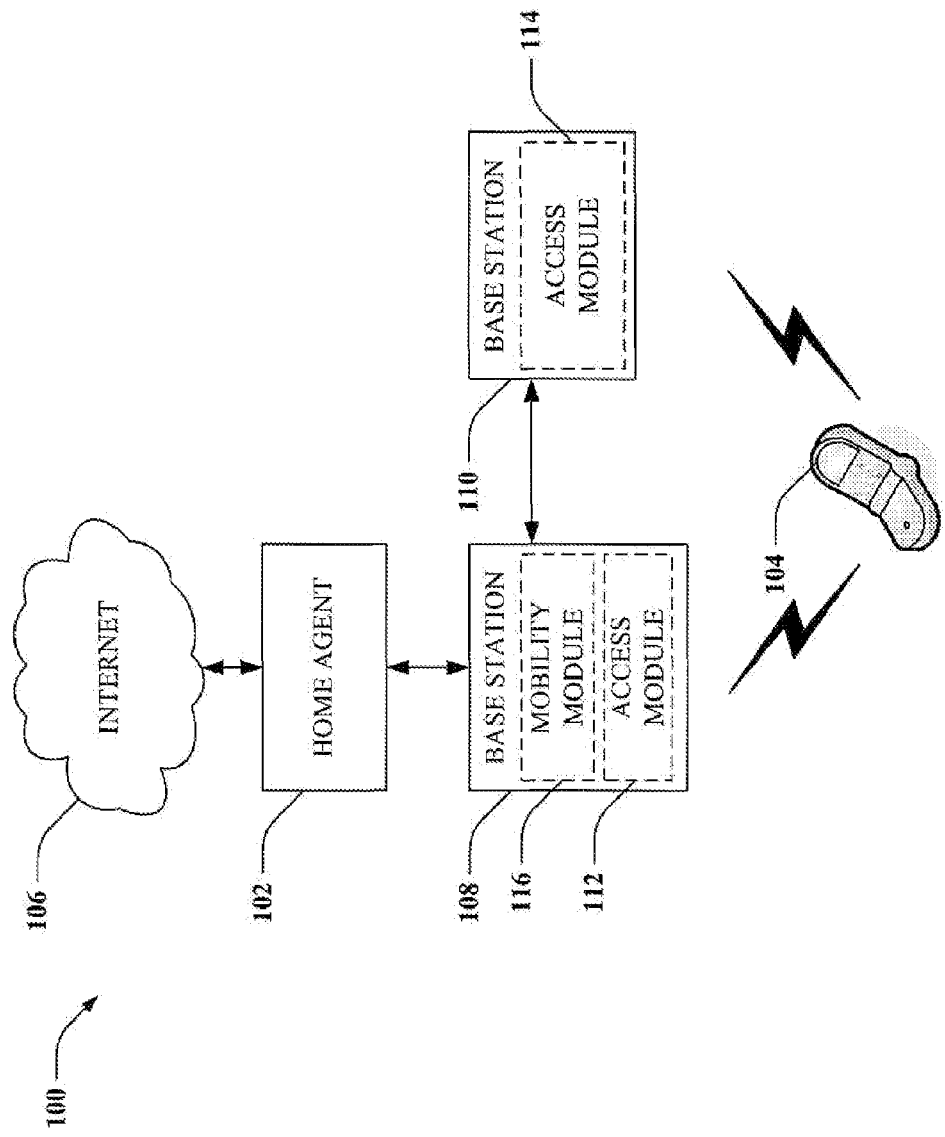
FIG. 1 is an example high-level block diagram of a network architecture wherein a base station can act as a regional mobility agent.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that such subject matter may be practiced without these specific details. In other instances, well-known structures and devices are shown in block diagram form in order to facilitate describing the disclosed subject matter.

Furthermore, various embodiments are described herein in connection with an access terminal. An access terminal can also be called a system, a subscriber unit, subscriber station, mobile station, user equipment, mobile device, remote station, remote terminal, user terminal, terminal, user agent, or user device. For example, an access terminal can be a cellular telephone, a cordless telephone, a Session Initiation Protocol (SIP) phone, a wireless local loop (WLL) station, a PDA, a handheld device having wireless connection capability, a processor within a mobile device, or other processing device connected to a wireless modem.

Moreover, aspects of the disclosed subject matter may be implemented as a method, apparatus, or article of manufacture using standard programming and/or engineering techniques to produce software, firmware, hardware, or any combination thereof to control a computer to implement various aspects described herein. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic, data such as those used in transmitting and receiving voice mail or in accessing a network such as a cellular network. Of course, it can be recognized that many modifications may be made to this configuration without departing from the scope or spirit of what is described herein.

Turning now to the drawings. FIG. 1 illustrates a network architecture 100 that can be utilized in association with regional registration of a wireless terminal. Architecture 100 includes a home agent 102, which can be a router on a home network of a wireless terminal 104 that maintains information regarding routing of packets received from the Internet 106 to wireless terminal 104. Pursuant to an example, home agent 102 can utilize tunneling mechanisms to forward data from the Internet 106, thereby not requiring an IP address of wireless terminal 104 to alter each time wireless terminal 104 connects to me home network from a different location.

Architecture 100 additionally includes a first base station 108 and a second base station 110, wherein first and second base stations 108 and 110 can relay data to and receive data from wireless terminal 104. The base stations 108 and 110 can each include an access module 112 and 114, respectively. The access modules 112 and 114 provide an air interface attachment point for wireless terminal 104. In an example, wireless terminal 104 can be powered on and can locate access module 112 through bidirectional communications. For instance, wireless terminal 104 can provide identifying indicia to access module 112, which can relay such information to an access and authentication (AAA) server (not shown). Upon being authenticated, wireless terminal 104 can request that services be provided by the first base station 108 (e.g., by indicating an identity of first base station 108). Pursuant to an example, such request can be undertaken by way of Mobile IP.

The first base station 108 can then inform home agent 102 of the request of wireless terminal 104, and can additionally request a home address for wireless terminal 104 (e.g., by indicating that there has not yet been a home address assigned). The home address can be an IP address assigned to wireless terminal 104 and/or a device that hosts wireless terminal 104. For instance, wireless terminal 104 can be a card that is peripheral to a phone, a computer, or other suitable device. Home agent 102, by way of Mobile IP, can provide a home address to base station 108 generally (and access module 112 in particular), which can in turn provide wireless terminal 104 with the home address. This enables home agent 102 and access module 112 to establish a tunnel between them, such that home agent 102 can provide, for instance, IP-encapsulated data packets to base station 108 by way of the tunnel. The data packets can include voice signals, text, images, and/or any other suitable data.

Base station 108 can additionally include a mobility module 116, which enables base station 108 to act as a point of attachment for an over-the-air (OTA) connection as well as a regional mobility agent. In other words, wireless terminal 104 can obtain a link with base station 110 (by way of access module 114) and mobility module 116 can be utilized to create a tunnel between base station 108 and base station 110. Therefore, home agent 102 need not be tasked with removing and adding tunnels each time wireless terminal 104 creates links with different base stations.

In a detailed example, a tunnel can be created between home agent 102 and first base station 108. Wireless terminal 104 can request a link with second base station 110. In more detail, wireless terminal can indicate to base station 110 that base station 108 is a primary base station by way of regional Mobile IP (regional registration). Second base station 110 can then inform first base station 108 that first base station 108 is to act as a primary base station. First base station can confirm information provided thereto by second base station 110 by way of regional Mobile IP, and second base station can confirm the link to wireless terminal 104 by way of regional Mobile IP. At such point mobility module 116 can create a tunnel between first base station 108 and second base station 110, and can further filter data according to pre-defined rules or based upon an air interface metric. Thus, home agent 102 provides data to first base station 108 by way of a tunnel, and first base station 108 can selectively provide second base station 110 with a subset of such data. In summary, first base station 108 can be configured to act as a regional mobility agent, which can also be referred to as a regional home agent and/or a regional foreign agent. Second base station 110 is implicitly aware that first base station 108 is acting as a regional mobility agent through a regional registration with wireless terminal 104.

Figure 2:
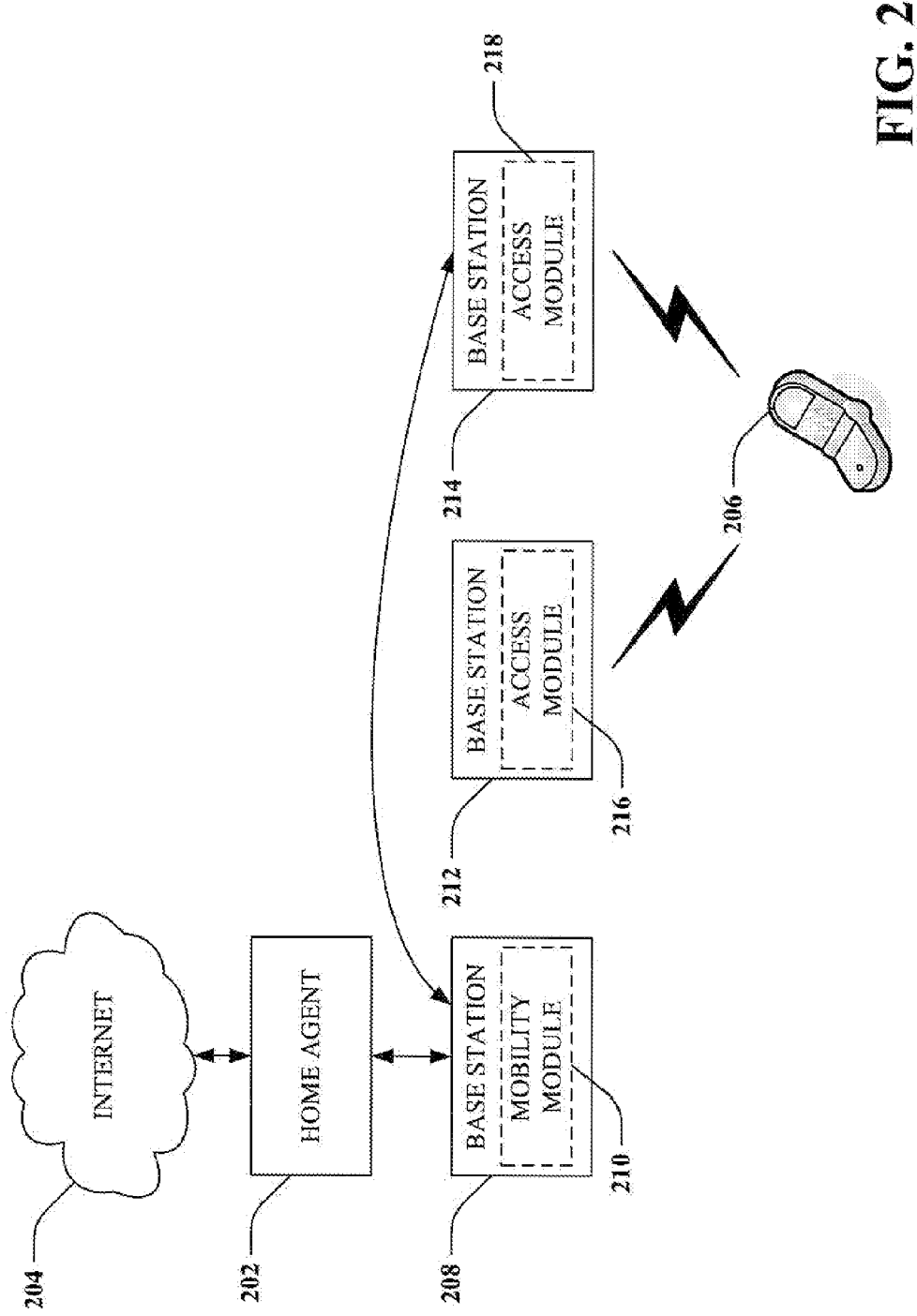
FIG. 2 is an example high-level block diagram of a network architecture wherein a base station can act as a regional mobility agent.

Now turning to FIG. 2, an example network architecture 200 is illustrated. Architecture 200 includes a home agent 202, which, as described above, can maintain information regarding routing of packets received from the Internet 204 to a wireless terminal 206. Architecture 200 additionally includes a first base station 208 that acts as a regional mobility agent with respect to wireless terminal 206. With more specificity, first base station 208 can include a mobility module 210, which enables first base station 208 to act as a regional mobility agent with respect to a particular region (e.g., with respect to one or more base stations in a particular area). In the example architecture 200, first base station 208 can act as a regional mobility agent with respect to a second base station 212 and a third base station 214, each of which include access modules 216 and 218, respectively, which provide an air interface attachment point for wireless terminal 206.

Pursuant to an example, wireless terminal 206 can initially register with home agent 202 by way of first base station 208. Therefore, a tunnel can be created between home agent 202 and first base station 208, wherein data can be exchanged between wireless terminal 206 and home agent 202 by way of first base station 208 and the aforementioned tunnel. As wireless terminal 206 is portable and subject to alteration of channel conditions, wireless terminal 206 may request or be informed to handoff from first base station 208 to second base station 210. Additionally or alternatively, wireless terminal 206 may have physical links with first base station 208 and second base station 210 simultaneously. As described above, wireless terminal 206 can be regionally registered with second base station 212 (through utilization of regional Mobile IP), such that first base station 208 is aware of a physical link with second base station 212 and second base station 212 is aware that first base station 208 is acting as a regional mobility agent for wireless terminal 206. Thus, data originating at home agent 202 and destined for wireless terminal 206 and/or data originating at wireless terminal 206 destined for home agent 202 will be directed through first base station 208. Mobility module 210 can retain filter rules that dictate which base station is to provide data to wireless terminal 206. For instance, mobility module 210 can direct data received from home agent 202 from first base station 208 to second base station 212 for transmittal to wireless terminal 206.

Continuing with the above example, wireless terminal 206 can geographically transition such that it is desirable to break a physical link with first base station 208 and create a physical link with third base station 214. Therefore, as shown, wireless terminal 206 can have links with second base station 212 and third base station 214. More particularly, wireless terminal 206 can create a link with third base station 214 through utilization of access module 218 and regional Mobile IP. During such registration, third base station 214 can be informed that first base station 208 is acting as a regional mobility agent, and first base station 208 can be informed that wireless terminal 206 has a physical link with third base station 214. First base station 208 can also be provided with and/or retain filter rules associated with third base station 214. Therefore, for instance, when home agent 202 provides data to first base station 208, first base station 208 can selectively disseminate the data to second base station 212 and third base station 214, respectively. This example is intended to illustrate that a base station can act as a regional home agent with respect to a wireless terminal without having a physical link thereto.

Figure 3:
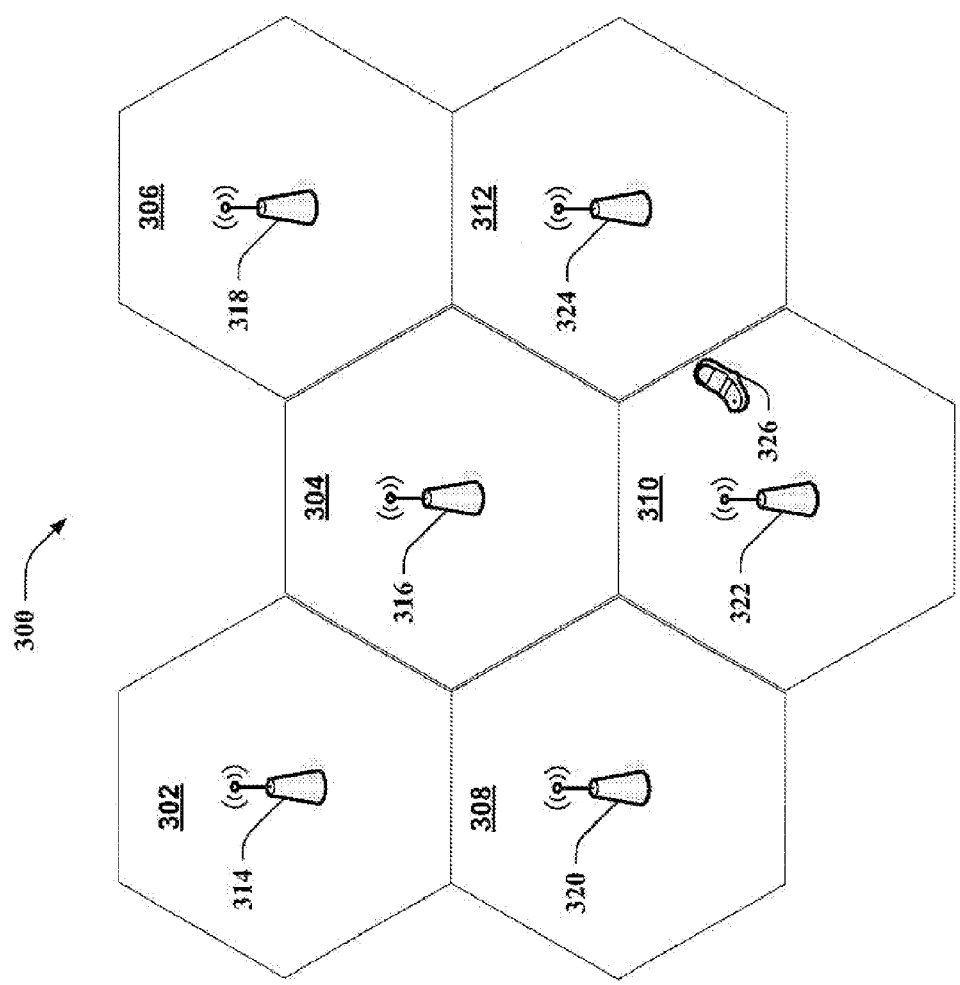
FIG. 3 is an example wireless communications environment.

Now turning to FIG. 3, an example wireless communications system 300 is illustrated. The system 300 includes a plurality of sectors 302-312, wherein a wireless terminal can employ wireless services within such sectors 302-312. While the sectors 302-312 are shown as being hexagonal in nature and of substantially similar size, it is understood that size and shape of sectors 302-312 can vary depending upon geographical region, number, size, and shape of physical impediments, such as buildings, and several other factors. Access points (base stations) 314-324 are associated with sectors 302-312, wherein access points 314-324 are utilized to provide services to user equipment within sectors 302-312. Additionally, one or more of access points 314-324 can act as a regional mobility manager with respect to other access points and a wireless terminal within system 300. For instance, in system 300, a wireless terminal 326 can have physical links with access point 322 and access point 324. It is to be understood, however, that wireless terminal 326 may have physical links with more than two access points at any particular point in time. Continuing with the example, access point 322 may serve as a primary access point for wireless terminal 326 and may act as a regional mobility agent with respect to access point 324 and wireless terminal 326.

In a particular example, wireless terminal 326 can have a physical link solely with access point 322. As wireless terminal 326 moves closer to a boundary of sector 310, however, it may be desirably for wireless terminal 326 to obtain a physical link with access point 324. In such a case, wireless terminal 326 can retain the physical link with access point 322 and/or such link can be removed. Wireless terminal 326 and access point 324 can configure the link through utilization of regional Mobile IP. Access point 322 (acting as a regional mobility agent) can be aware that wireless terminal 326 has a physical link with access point 324 and access point 324 can be aware that access point 322 is acting as regional manager. Additionally, access point 324 can provide access point 322 with one or more filter rules that dictates how traffic relating to wireless terminal 326 is to flow through access point 326. Thus, for instance, when data is desirably delivered to wireless terminal 326, such data can initially be provided to access point 322, which can selectively distribute the data amongst access point 322 and access point 324 (according to one or more filter rules). Data can then be provided to wireless terminal 326.

Figure 4:
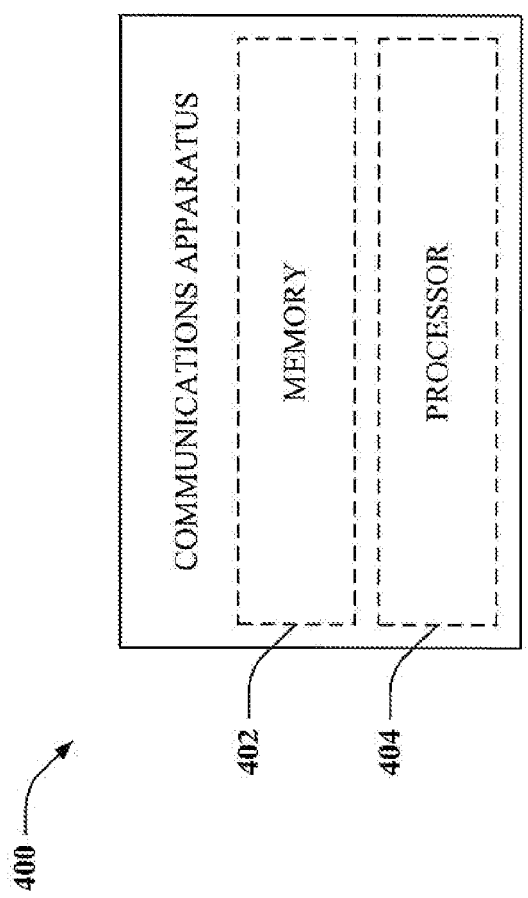
FIG. 4 is an example apparatus that facilitates enabling a base station to act as a regional mobility agent.

Now referring to FIG. 4, a communications apparatus 400 for employment within a wireless communications environment is illustrated. The apparatus 400 can be a base station (e.g., access router, access point, . . . ) or a portion thereof, a home agent (e.g., a server or portion thereof), a wireless terminal, a host device, or other suitable wireless communications device. Apparatus 400 can include a memory 402 that retains various instructions with respect to enabling a base station to act as a regional mobility agent.

In an example, apparatus 400 can be a home agent, which may be a server, a collection of servers, within a server, and/or distributed amongst a collection of servers. In such a case, memory 402 can include instructions for receiving an indication that a wireless terminal desires a physical link with a base station, wherein the indication can conform to Mobile IP. Additionally, memory 402 can include instructions for configuring the base station to act as a regional mobility agent (e.g., regional home agent or regional foreign agent) with respect to the wireless terminal. As a portion of such configuration, the home agent can provide the base station with a home address, which can be an IP address that is associable with the wireless terminal. Again, such configuration can be undertaken through employment of Mobile IP between the home agent and the base station. Apparatus 400 can further include a processor 404 for executing the instructions.

In another example, apparatus 400 can be a base station that is either configured to act as a regional mobility agent or that is associated with a base station that is acting as a regional mobility agent. Memory 402 can include instructions for receiving an indication that a wireless terminal desires a physical link with the base station. Such indication can be received by way of Mobile IP and transmitted OTA to the base station from the wireless terminal. Memory 402 can also include instructions for informing a home agent of the request for the physical link, wherein such request can fee transmitted by way of Mobile IP. Memory 402 can additionally include instructions for acting as a regional mobility agent with respect to the wireless terminal upon receipt of a home address from the home agent. If apparatus 400 is a base station that is not a primary base station (e.g., not acting as a regional mobility agent), memory 402 can include instructions for receiving a request for a physical link from a wireless terminal (by way of regional Mobile IP) and also for informing a primary base station of the request. Memory 402 can also include instructions for informing the primary base station of one or more filter rules that relate to provision of data to the wireless terminal. Moreover, memory 402 can retain instructions for creating a tunnel between apparatus 400 and the primary base station and for transmitting data received by way of the tunnel to the wireless terminal. Processor 402 can be configured to execute such one or more of the aforementioned instructions.

Figure 5:
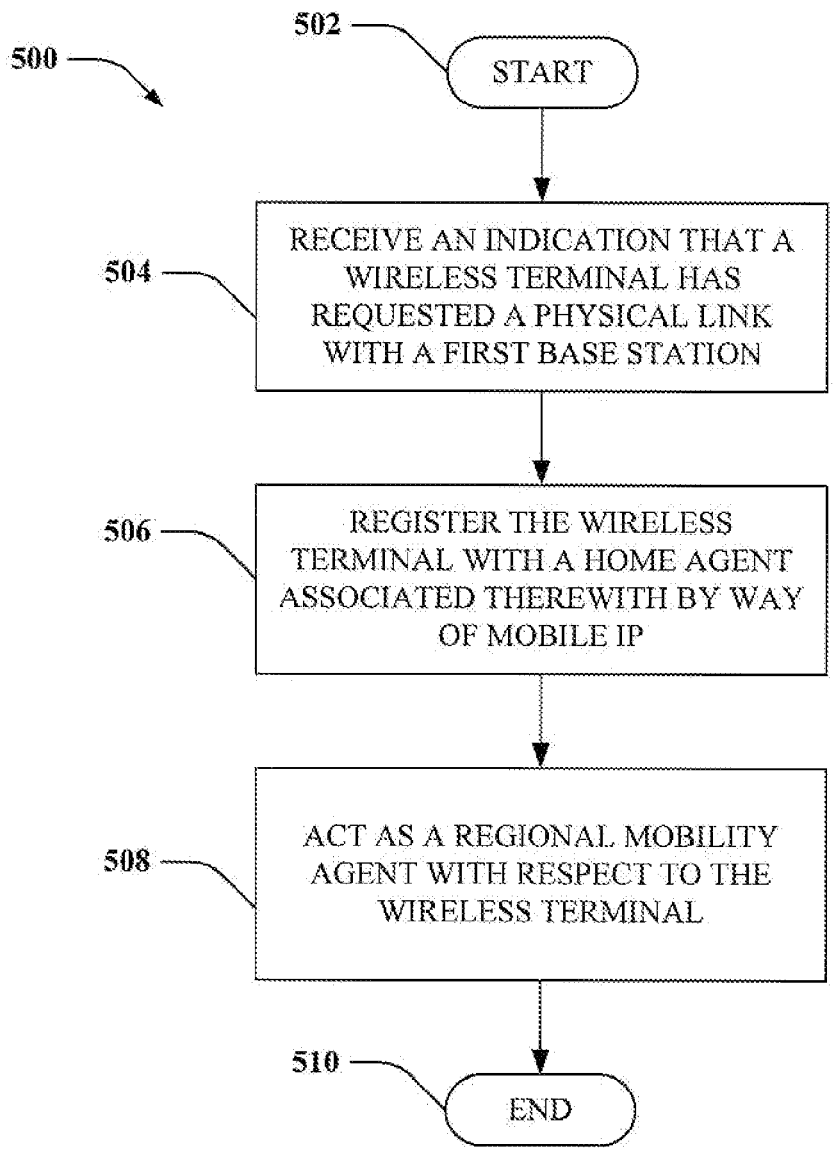
FIG. 5 is a representative flow diagram illustrating an example methodology for causing a base station to act as a regional mobility agent with respect to a wireless terminal.
Figure 6:
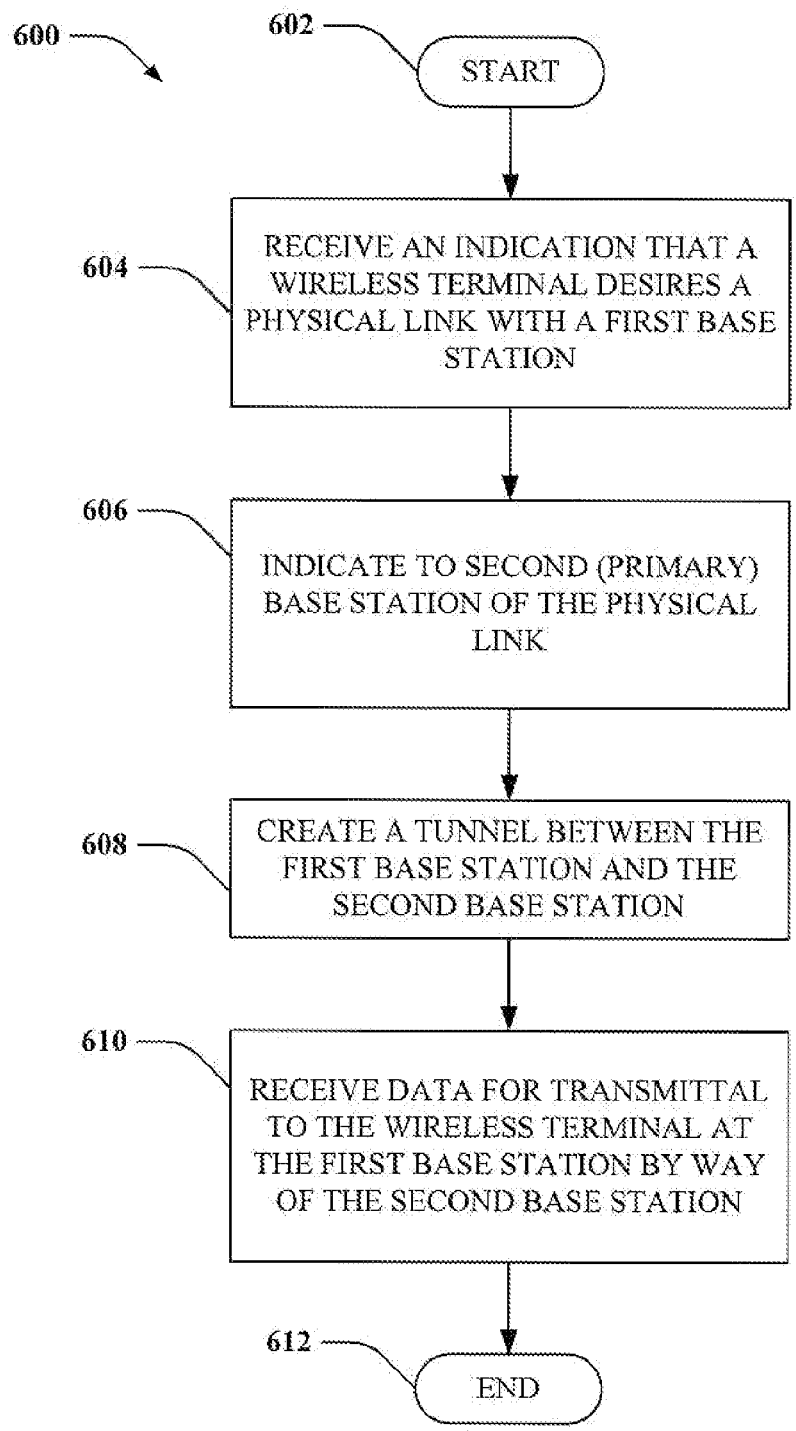
FIG. 6 is a representative flow diagram illustrating an example methodology for transmitting data to a wireless terminal.
Figure 7:
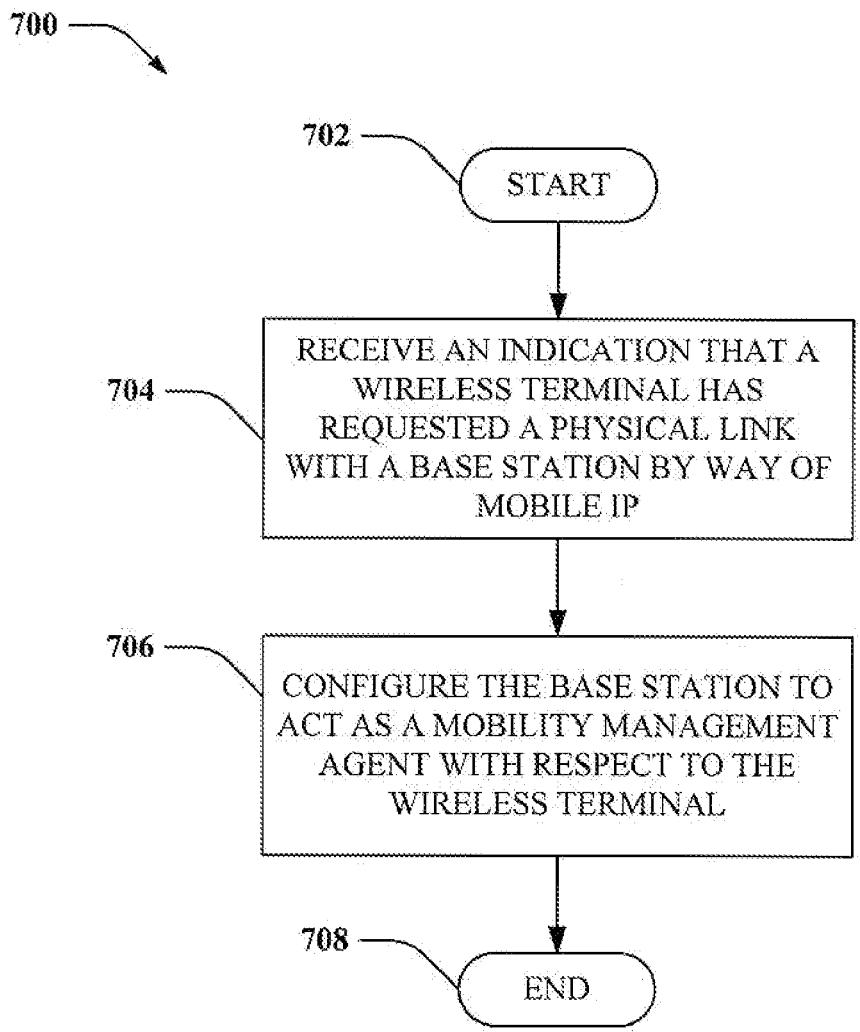
FIG. 7 is a representative flow diagram illustrating an example methodology for configuring a base station to act as a regional mobility agent.

Referring to FIGS. 5-7, methodologies relating to regional registration of a wireless terminal is illustrated. While, for purposes of simplicity of explanation, the methodologies are shown and described as a series of acts, it is to be understood and appreciated that the methodologies are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

Referring solely to FIG. 5, a methodology 500 for configuring/utilizing a base station to act as a regional mobility agent with respect to a wireless terminal and/or one or more other base stations is illustrated. Methodology 500 begins at 502, and at 504 an indication is received that a wireless terminal has requested a physical layer link with a first base station. In an example, the wireless terminal can request a home address from the first, base station by way of Mobile IP. At 506, the wireless terminal is registered with a home agent by way of Mobile IP. Pursuant to an example, the first base station can request a home address from the home agent. Additionally, the first base station and the home agent can set up a tunnel therebetween for data that is to be transmitted to the wireless terminal or received from the wireless terminal. Therefore, the home agent will have knowledge that the first base station is acting as a regional mobility agent with respect to the wireless terminal. At 508, the first base station acts as a regional mobility agent for the wireless terminal. For instance, if the wireless terminal obtains a physical link with a second base station, the first base station and second base station can create a tunnel therebetween and the first base station can selectively provide data to the second base station for transmittal to the wireless terminal (according to one or more filter rules). In another example, the wireless terminal can provide data over an uplink to the second base station, which can then relay such data to the first base station, which in turn can transmit the data to the home agent or another suitable network module. Methodology 500 then completes at 510.

Now referring to FIG. 6, a methodology 600 for transmitting data to a wireless terminal is illustrated. Methodology 600 starts at 602, and at 604 an indication is received at a first base station that a wireless terminal desires a physical link with such base station. In more detail, the wireless terminal can be ported through a wireless communications network and can request services from the first base station. At 606, the first base station can inform a second base station of the physical link with the wireless terminal. The second base station can be a primary base station—in other words, the second base station can act as a regional mobility agent with respect to the wireless terminal. This enables the wireless terminal to be regionally registered (instead of having to re-register with the home agent after each handoff).

At 608, a tunnel is created between the first base station and the second base station, wherein the tunnel is in addition to a tunnel created between a home agent and the second base station. Therefore, any data traffic that between the home agent and the first base station will be relayed through the second base station, which is acting as a regional mobility agent with respect to the first base station and the wireless terminal. At 610, data is received at the first base station for transmittal to the wireless terminal, wherein the data is received from the second base station. In an example, the second base station can receive data from the home agent that is desirably provided to the wireless terminal. According to one or more filter rules (which can be static or dynamic), the second base station can selectively provide a subset of the received data to the first base station (by way of the tunnel created at 608). For instance, depending upon measured SNR, a certain amount of data can be directed to the first base station for transmittal to the wireless terminal. The methodology 600 then completes at 612.

Turning now to FIG. 7, a methodology 700 for configuring a base station to act as a regional mobility agent is illustrated. Methodology 700 starts at 702, and at 704 an indication that a wireless terminal has requested a physical link with a base station is received by way of Mobile IP. For example, this indication can be received at a home agent, and the indication can include a request for a home address for the wireless terminal. At 706, the home agent can configure the base station to act as a regional mobility agent for the wireless terminal. In an example, this can be accomplished by providing the base station with a home address that is to be assigned to the wireless terminal. The methodology 700 then completes at 708.

Figure 8:
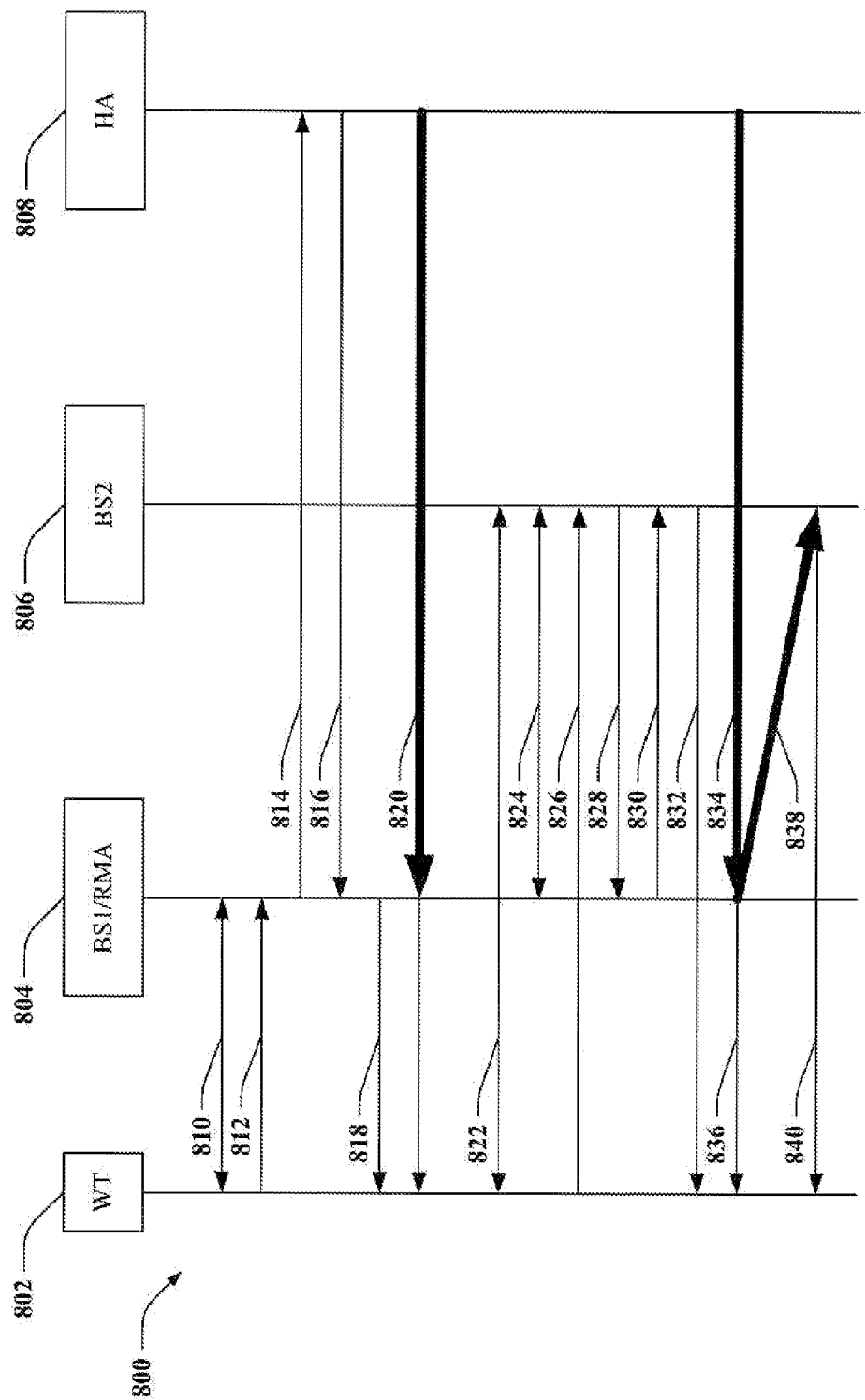
FIG. 8 is an example flow diagram illustrating interaction amongst a wireless terminal, two base stations, and a home agent with respect to utilizing a base station as a regional mobility agent.

With reference now to FIG. 8, an example flaw diagram 800800 illustrating interaction between a wireless terminal 802, a first base station 804, a second base station 806, and a home agent 808 in connection with utilizing a base station to act as a regional mobility agent is illustrated. At 810, wireless terminal 802 and first base station 804 communicate with one another to determine services available to wireless terminal 802, to authenticate identity of wireless terminal 802, and/or to identify first base station 804 as a desired regional mobility agent. At 812, wireless terminal 802 indicates to first base station 804 that wireless terminal 802 desires to be serviced by first base station 804. Thereafter, at 814 first base station 804 indicates to home agent that first base station 804 will be providing services with respect to wireless terminal 802 and requests a home address for wireless terminal 802 from home agent 808. Such communication can be undertaken through utilization of Mobile IP. At 816, home agent 808 confirms the registration request 814 and optionally provides first base station 804 (or the wireless terminal 802 directly) with a home address for wireless terminal 802 and/or a host device (not shown) associated therewith. First base station 804 can then provide wireless terminal 802 with the home address at 818.

At 820, a tunnel can be created between home agent 808 and first base station 804 (or directly to the wireless terminal 802), such that home agent 808 can direct data to wireless terminal 802 by way of first base station 804. At 822, wireless terminal 802 and second base station 806 communicate, wherein wireless terminal 802 can provide an indication to second base station 806 that wireless terminal 802 desires a physical link with second base station 806. At 824, first base station 804 provides second base station 806 with a profile for wireless terminal 802, as well as services associated with wireless terminal 802. Alternatively signaling 824 between the wireless terminal 802 and base station 2 806 is performed via existing link with base station 1 804. At 826, by way of regional Mobile IP, wireless terminal 802 informs second base station that first base station 804 is acting as a regional mobility agent for wireless terminal 802, and further indicates to second base station 806 that a Care of Address (CoA) is associated with second base station 806, that an alternate CoA is associated with first base station 804, and can additionally provide first base station 804 with one or more filter rules. At 828, by way of regional Mobile IP, second base station 806 indicates to first base station 804 that first, base station is acting as the regional mobility agent, that the CoA is associated with second base station 806, that an alternate CoA is associated with first base station 804, and can additionally provide first base station 804 with one or more filter rules.

At 830, first base station 804 confirms such information, and at 832 a link is created between wireless terminal 802 and second base station 806 through utilization of regional Mobile IP. At 834, data that is intended for wireless terminal 802 is provided from home agent 808 to first base station 804. First base station 804 can then relay a subset of such data to wireless terminal 802 at 836. Additionally, at 838, first base station 804 can relay a subset of the data to second base station 806 by way of a tunnel created therebetween. Then second base station 806 can deliver such subset of data to wireless terminal 802 over a (secondary) link.

Figure 9:
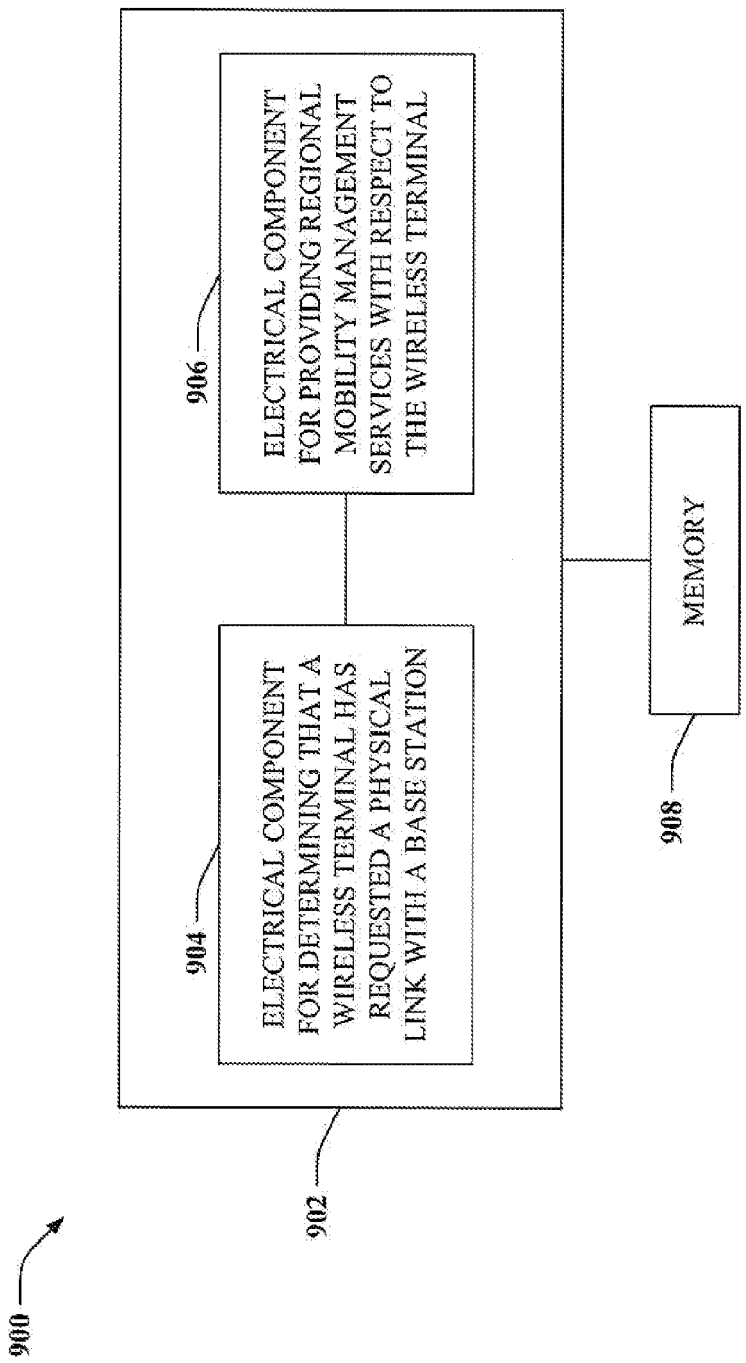
FIG. 9 is an example system that facilitates providing regional mobility management services within a base station to a wireless terminal.
Figure 10:
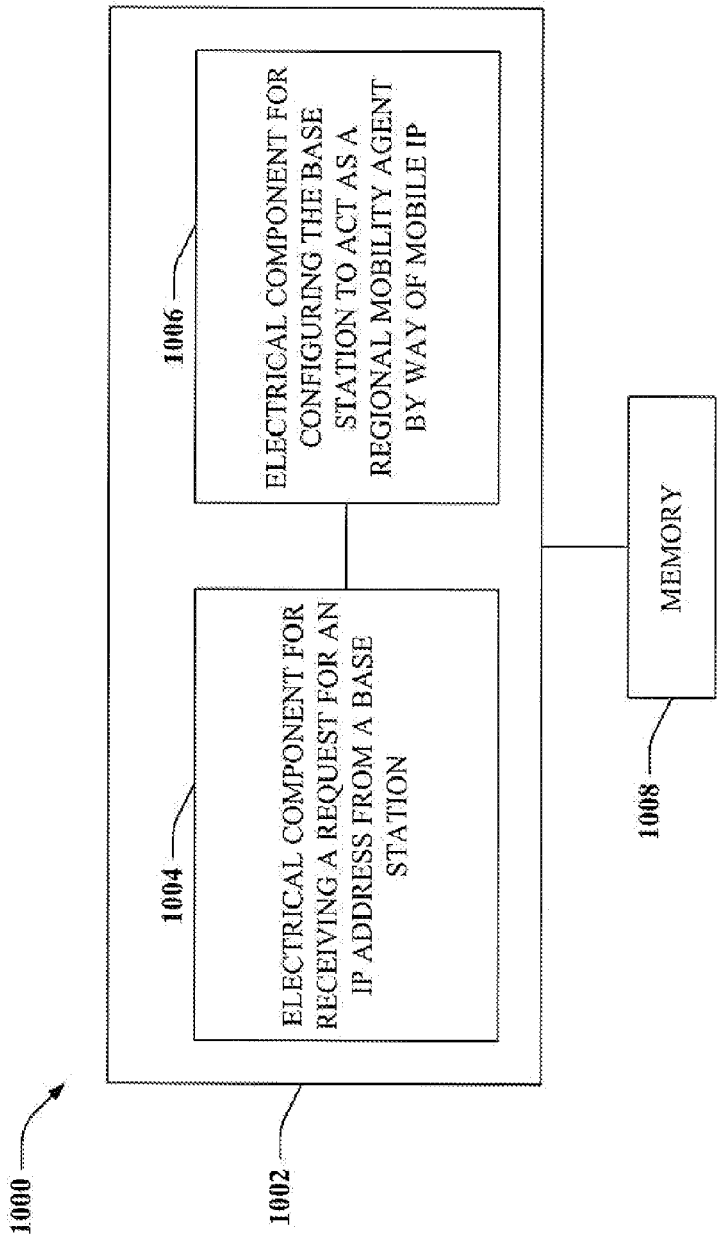
FIG. 10 is an example system that configuring a base station to act as a regional mobility agent.

Now referring collectively to FIGS. 9 and 10, systems 900 and 1000 are illustrated, wherein such systems relate to utilizing a base station as a regional mobility agent. It is to be appreciated that systems 900 and 100 are represented as including functional blocks, wherein such blocks can represent functions implemented by a processor, software, or a combination thereof (e.g., firmware).

Turning specifically to FIG. 9, a system 900 that facilitates provision of regional mobility management services to a wireless terminal by a base station is illustrated. In an example, system 900 can be a base station and/or can be comprised by a base station. System 900 includes a grouping 902 of electrical components, wherein such components can act in conjunction to enable a base station to act as a regional mobility agent. Grouping 902 includes an electrical component 904 for determining that a wireless terminal has requested a physical link with a base station. In an example, such determination can be made by reviewing a channel quality indicator (CQI) report, by recognizing an explicit request by a wireless terminal, etc. Grouping 902 additionally includes an electrical component 906 for providing regional mobility management services with respect to the wireless terminal. Therefore, me wireless terminal can regionally register with another base station. System 900 can also include a memory 908, which can retain instructions relating to executing components 904-906. Alternatively, grouping 902 and contents thereof can be comprised by memory 908.

With reference to FIG. 10, a system 1000 that facilitates configuring a base station to act as a regional mobility agent is illustrated. System 1000 includes a grouping 1002 of electrical components that act in conjunction to configured a base station as described above. Grouping 1002 includes an electrical component 1004 for receiving a request for an IP address from a base station. Such request can be received over the Mobile IP protocol. Grouping 1002 additionally includes an electrical component 1006 for configuring the base station to act as a regional mobility agent over Mobile IP. System 1000 also includes a memory 1008, wherein the memory can retain instructions for executing components 1004 and 1006 and/or can retain such components.

Figure 11:
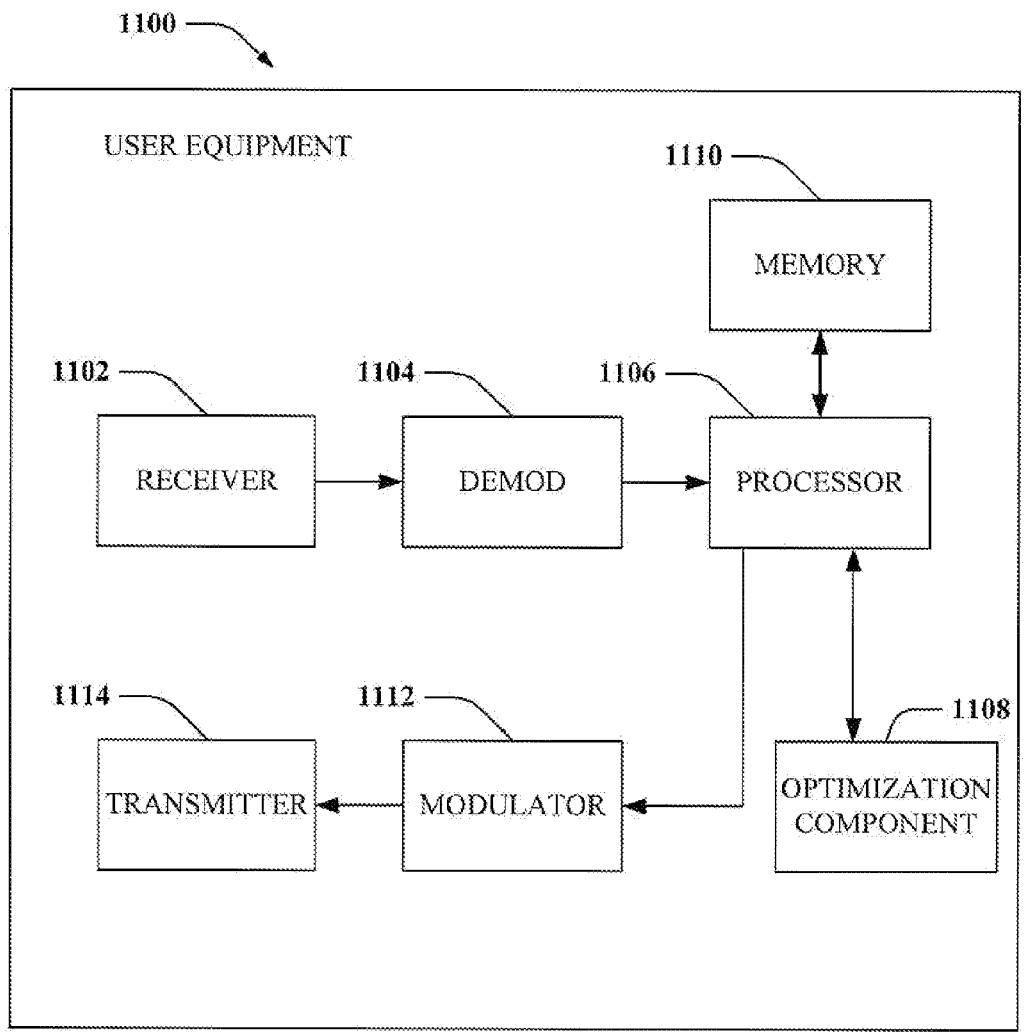
FIG. 11 is an illustration of an example system that can be utilized in connection with requesting a handoff.

FIG. 11 illustrates a system 1100 that can be utilized in connection with utilizing a base station as a regional mobility agent. System 1100 comprises a receiver 1102 that receives a signal from, for instance, one or more receive antennas, and performs typical actions thereon (e.g., filters, amplifies, downconverts, . . . ) the received signal and digitizes the conditioned signal to obtain samples. A demodulator 1104 can demodulate and provide received pilot symbols to a processor 1106 for channel estimation.

Processor 1106 can be a processor dedicated to analyzing information received by receiver component 1102 and/or generating information for transmission by a transmitter 1114. Processor 1106 can be a processor that controls one or more portions of system 1100, and/or a processor that analyzes information received by receiver 1102, generates information for transmission by a transmitter 1114, and controls one or more portions of system 1100. System 1100 can include an optimization component 1108 that can optimize performance of user equipment before, during, and after handoff. Optimization component 1108 may be incorporated into the processor 1106. It is to be appreciated that optimization component 1108 can include optimization code that performs utility based analysis in connection with determining whether to handoff from a source transceiver module to a target transceiver module. The optimization code can utilize artificial intelligence based methods in connection with performing inference and/or probabilistic determinations and/or statistical-based determination in connection with performing handoffs.

System (user equipment) 1100 can additionally comprise memory 1110 that is operatively coupled to processor 1106 and that stores information such as signal strength information with respect to a base station (transceiver module), scheduling information, and the like, wherein such information can be employed in connection with determining whether and when to request a handoff. Memory 1110 can additionally store protocols associated with generating lookup tables, etc., such that system 1100 can employ stored protocols and/or algorithms to increase system capacity. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1110 is intended to comprise, without being limited to, these and any other suitable types of memory. Processor 1106 is connected to a symbol modulator 1112 and transmitter 1114 that transmits the modulated signal.

Figure 12:
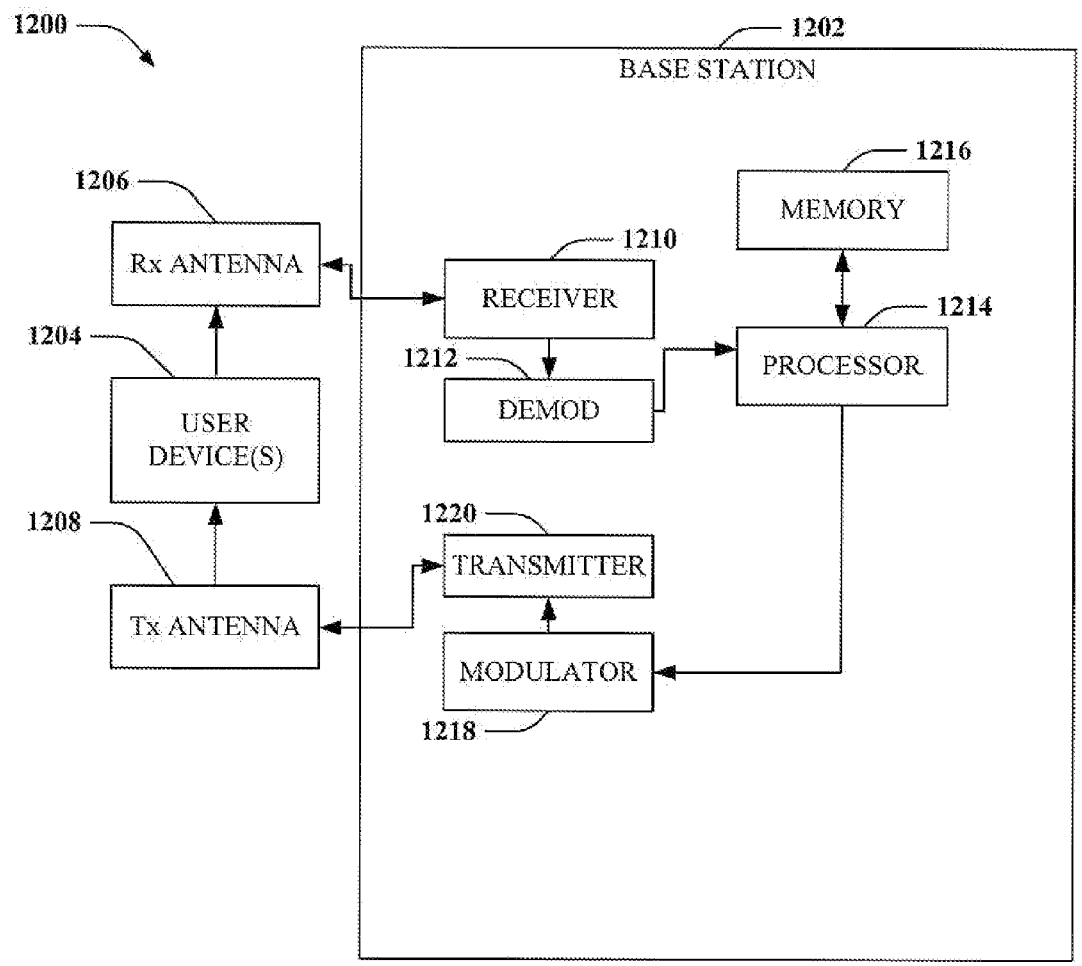
FIG. 12 is an illustration of an example system that can be utilized as a regional mobility agent.

FIG. 12 illustrates a system that can be configured to act as a regional mobility agent. System 1200 comprises abase station 1202 with a receiver 1210 that receives signal(s) from one or more user devices 1204 by way of one or more receive antennas 1206, and transmits to the one or more user devices 1204 through a plurality of transmit antennas 1208. In one example, receive antennas 1206 and transmit antennas 1208 can be implemented using a single set of antennas. Receiver 1210 can receive information from receive antennas 1206 and is operatively associated with a demodulator 1212 that demodulates received information. Receiver 1210 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. For instance, multiple receivers can be employed (e.g., one per receive antenna), and such receivers can communicate with each other to provide improved estimates of user data. Demodulated symbols are analyzed by a processor 1214 that is similar to the processor described above with regard to FIG. 11, and is coupled to a memory 1216 that stores information related to user device assignments, lookup tables related thereto and the like. Receiver output for each antenna can be jointly processed by receiver 1210 and/or processor 1214. A modulator 1218 can multiplex the signal for transmission by a transmitter 1220 through transmit antennas 1208 to user devices 1204.

It is to be understood that the embodiments described herein may be implemented by hardware, software, firmware, middleware, microcode, or any combination thereof. For a hardware implementation, the processing units within an user equipment or a network device may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the systems and/or methods described herein are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. A memory unit may be implemented within the processor or external to the processor, in which case it can be communicatively coupled to the processor through various means.

What has been described above includes examples of the disclosed subject matter. It is, of course, not possible to describe every conceivable combination of components or methodologies for purposes of describing such subject matter, but one of ordinary skill in the art may recognize that many further combinations and permutations are possible. Accordingly, the subject matter is intended to embrace all such alterations, modifications, and variations that fall within the spirit and scope of the appended claims. Furthermore, to die extent that the term "includes" is used in either the detailed description or the claims, such term is intended to be inclusive in a manner similar to the term "comprising" as "comprising" is interpreted when employed as a transitional word in a claim.

What is claimed is:

1. A method of operating a first base station, comprising:
   receiving an indication that an access terminal has requested a physical link with the first base station;
   creating a tunnel between a home agent corresponding to said access terminal and said first base station through which the home agent can direct data to the access terminal by way of the first base station;
   receiving an indication that the first base station is to act as a regional home agent;
   acting as the regional home agent with respect to the access terminal and a second base station; wherein acting as the regional home agent with respect to the access terminal includes: relaying a first subset of data received from the home agent to the access terminal by way of a tunnel between the first base station and the second base station; and
   receiving from said second base station a Care of Address (CoA) associated with the second base station and an alternate Care of Address associated with the first base station.

2. The method of claim 1,
   wherein receiving an indication that the first base station is to act as a regional home agent includes receiving a signal from the second base station indicating that the first base station is to act as a primary base station, the method further comprising:
   receiving an indication that the access terminal has requested a physical link with the second base station; and
   prior to relaying the first subset of data, creating said tunnel between the first base station and the second base station for transmittal of data relayed from said home agent to the access terminal by way of said first base station.

3. The method of claim 1, wherein said Care of Address and said alternate Care of Address were obtained by said second base station from said access terminal.

4. A method of operating a first base station, comprising:
   receiving an indication that an access terminal has requested a physical link with the first base station;
   creating a tunnel between a home agent corresponding to said access terminal and said first base station through which the home agent can direct data to the access terminal by way of the first base station;
   receiving an indication that the first base station is to act as a regional home agent;
   actin as the regional home agent with respect to the access terminal and a second base station; wherein acting as the regional home agent with respect to the access terminal includes: relaying a first subset of data received from the home agent to the access terminal by way of a tunnel between the first base station and the second base station; and
   storing a set of filter rules used to control how data relating to the access terminal is to be selectively distributed to one or more access points for delivery to the access terminal.

5. The method of claim 4, further comprising:
   registering the access terminal with a home agent; and
   acting as the regional home agent for said access terminal after a link with said first base station has been terminated, acting as the regional home agent for said access terminal after a link with said first base station has been terminated including:

selectively distributing data to be distributed to said access terminal to a third base station with which said access terminal establishes a link subsequent to establishment of a link with said second base station.

6. A first base station, comprising:
a memory that comprises instructions for:
receiving an indication that a wireless terminal desires a physical link with the first base station;
creating a tunnel between a home agent corresponding to said wireless terminal and said first base station through which the home agent can direct data to the access terminal by way of the first base station;
receiving an indication that said first base station is to act as a regional home agent with respect to the wireless terminal;
acting as the regional home agent with respect to the wireless terminal and a second base station, and relaying a first subset of data received from the home agent to the wireless terminal by way of a tunnel between the first base station and the second base station;
receiving from the second base station a Care of Address (CoA) associated with the second base station and an alternate Care of Address associated with the first base station and
a processor that is configured to execute the instructions within the memory.

7. The first base station of claim 6, wherein the memory further comprises instructions for:
receiving an indication that the wireless terminal has requested a physical link with the second base station; and
creating said tunnel between the first base station and the second base station.

8. The first base station of claim 6, wherein the memory further comprises instructions for storing a set of filter rules used to control how data relating to the wireless terminal is to be selectively distributed to one or more access points for delivery to the wireless terminal.

9. The first base station of claim 6, wherein said Care of Address and said alternate Care of Address were obtained by said second base station from said access terminal.

10. A non-transitory computer-readable medium comprising computer executable instructions for controlling a first base station, said non-transitory computer-readable medium comprising instructions for controlling said first base station to:
receive an indication that an access terminal has requested a physical link with the first base station;
create a tunnel between a home agent corresponding to said access terminal and said first base station through which the home agent can direct data to the access terminal by way of the first base station;
receive an indication that the first base station is to act as a regional home agent;
act as the regional home agent with respect to the access terminal and a second base station;
receive from said second base station a Care of Address (CoA) associated with the second base station and an alternate Care of Address associated with the first base station; and
wherein instructions for controlling said first base station to act as the regional home agent with respect to the access terminal includes instructions for controlling said first base station to relay a first subset of data received from the home agent to the access terminal by way of a tunnel between the first base station and the second base station.

11. A base station comprising the non-transitory computer readable medium of claim 10.

12. The non-transitory computer-readable medium of claim 10, further comprising instructions for controlling said first base station to:
receive an indication that the access terminal has requested a physical link with the second base station; and
create said tunnel between the first base station and the second base station, prior to relaying the first subset of data, for transmittal of data relayed from said home agent to the access terminal by way of said first base station.

13. The non-transitory computer-readable medium of claim 10, further comprising instructions for controlling said first base station to store a set of filter rules used to control how data relating to the access terminal is to be selectively distributed to one or more access points for delivery to the access terminal.

14. The non-transitory computer-readable medium of claim 10, wherein said Care of Address and said alternate Care of Address were obtained by said second base station from said access terminal.

15. A first base station, comprising:
means for determining that a wireless terminal has requested a physical link with the communications apparatus;
means for creating a tunnel between a home agent corresponding to said wireless terminal and said first base station through which the home agent can direct data to the wireless terminal by way of the first base station;
means for receiving an indication that the first base station is to act as a regional home agent;
means for acting as the regional home agent and providing mobility management services with respect to the wireless terminal and a second base station;
means for receiving data from the home agent that is intended for the wireless terminal;
means for relaying a first subset of data received from the home agent to the wireless terminal by way of a tunnel between said first base station and the second base station; and
means for receiving from said second base station a Care of Address (CoA) associated with the second base station and an alternate Care of Address associated with the first base station.

16. The first base station of claim 15, further comprising means for receiving an indication that the wireless terminal has requested a physical link with the second base station.

17. The first base station of claim 15, further comprising:
means for relaying a second subset of the data to the wireless terminal while relaying the first subset of the data to the wireless terminal by way of said tunnel between the first base station and the second base station.

18. The first base station of claim 15, further comprising means for creating said tunnel between the first base station and the second base station for transmittal of data relayed from said home agent to the access terminal by way of said first base station.

19. The first base station of claim 15, further comprising means for requesting a home address for the wireless terminal from a home agent by way of a mobility agent.

20. The first base station of claim 15, further comprising means for receiving filter rules from the base station by way of a mobility agent.

21. A processor for use in a first base station, said processor being configured to:

receive an indication that an access terminal has requested a physical link with the first base station;

create a tunnel between a home agent and said first base station through which the home agent can direct data to the access terminal by way of the first base station;

receive an indication that the first base station is to act as a regional home agent;

act as the regional home agent with respect to the access terminal and a second base station;

relay a first subset of data received from a home agent corresponding to said access terminal to the access terminal by way of a tunnel between the first base station and the second base station; and receive from said second base station a Care of Address (CoA) associated with the second base station and an alternate Care of Address associated with the first base station.

\* \* \* \* \*